United States Patent
Haddad, Jr.

(10) Patent No.: US 6,206,448 B1
(45) Date of Patent: *Mar. 27, 2001

(54) VARIABLE HEIGHT COVERING SYSTEM

(75) Inventor: Edward N. Haddad, Jr., Worcester, MA (US)

(73) Assignee: Pioneer Consolidated Corporation, North Oxford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/251,961

(22) Filed: Feb. 17, 1999

Related U.S. Application Data (63) Continuation-in-part of application No. 09/229,017, filed on Jan. 12, 1999
(60) Provisional application No. 60/075,722, filed on Feb. 24, 1998.

(51) Int. Cl.[7] .................................................. B60P 7/04
(52) U.S. Cl. ............................. 296/98; 296/100.01
(58) Field of Search ..................... 296/98, 101, 100.01, 296/100.11, 100.15, 100.16; 160/68, 69, 72, 71

(56) References Cited

U.S. PATENT DOCUMENTS

| | | | |
|---|---|---|---|
| 3,549,197 | 12/1970 | Sibley | 296/100 |
| 3,774,958 | * 11/1973 | Thorpe | 296/98 |
| 3,868,142 | 2/1975 | Bachand et al. | 296/98 |
| 4,050,734 | 9/1977 | Richard | 296/98 |
| 4,341,416 | 7/1982 | Richard | 296/98 |
| 4,516,802 | 5/1985 | Compton | 296/98 |
| 4,740,029 | 4/1988 | Tuerk | 296/100 |
| 4,842,323 | * 6/1989 | Trickett | 296/98 |
| 4,848,823 | * 7/1989 | Flohr et al. | 296/98 |
| 5,031,955 | * 7/1991 | Searfoss | 296/98 |
| 5,054,840 | 10/1991 | Wilhite | 296/98 |
| 5,179,991 | * 1/1993 | Haddad | 296/98 X |
| 5,205,605 | 4/1993 | Haddad | 296/98 |
| 5,238,287 | 8/1993 | Haddad | 296/98 |
| 5,292,169 | * 3/1994 | O'Brian | 296/98 |
| 5,303,972 | 4/1994 | Heider et al. | 296/98 |
| 5,340,187 | * 8/1994 | Haddad | 296/98 |
| 5,697,664 | * 12/1997 | Chenowth | 296/98 |
| 5,823,604 | * 10/1998 | Chenowth | 296/98 |
| 5,829,819 | * 11/1998 | Searfoss | 296/98 |
| 5,957,523 | * 9/1999 | Haddad, Jr. | 296/98 |
| 6,089,645 | * 7/2000 | Haddad, Jr. | 296/98 |

FOREIGN PATENT DOCUMENTS

| | | | |
|---|---|---|---|
| 581512 | * 7/1988 | (EP) | 296/98 |
| 131835 | * 6/1987 | (JP) | 296/98 |
| 173740 | * 7/1988 | (JP) | 296/98 |

OTHER PUBLICATIONS

Publication: Do It Right with Roll Rite, Tarp Systems and Components, 1996 Roll–Rite Corporation Printed in the U.S.A. (4 pp.).

* cited by examiner

*Primary Examiner*—Joseph D. Pape
(74) *Attorney, Agent, or Firm*—Weingarten, Schurgin, Gagnebin & Hayes LLP (57) ABSTRACT

A system for manipulating a transport container cover using a variable height gantry. The gantry supports an assembly for storing the cover including a winding mechanism. The gantry height is adjustable so that the cover may be raised above the top of the transport container. The cover is extended over the top of the container when the gantry is at a position such that the storage assembly can release the cover above the top of the transport container. An attachment mechanism on the other end of the cover secures the cover. The gantry is adjusted to a low position for transporting the covered container. A motor is included to drive the winding mechanism to assist in withdrawing the cover. Alternatively, the winding mechanism may be operated by way of a hand crank, or may include a spring loaded roller. The system is operable to withdraw the cover when the gantry is in its raised position. The optional motor and the clutch mechanism may be operated through radio signals generated with a wireless remote control.

34 Claims, 9 Drawing Sheets

VARIABLE HEIGHT COVERING SYSTEM

CROSS REFERENCE TO RELATED APPLICATIONS

This application is a Continuation in Part of prior application Ser. No. 09/229,017, entitled "Variable Height Covering System", of Edward N. Haddad, filed Jan. 12, 1999. This application claims priority under 35 U.S.C. §119(e) to provisional patent application Ser. No. 60/075,722 filed Feb. 24, 1998, the disclosure of which is hereby incorporated by reference.

STATEMENT REGARDING FEDERALLY SPONSORED RESEARCH OR DEVELOPMENT

Not Applicable

FIELD OF THE INVENTION

The invention relates generally to transport container covers and more particularly to a system for manipulating a truck mounted container cover.

BACKGROUND OF THE INVENTION

Covers for transport containers, as found in or used with trucks, trailers and other transport vehicles, are necessary for many reasons. For example, such covers reduce the likelihood that the load being carried escapes, and also protect the load from the elements. Typically these covers are large and heavy, and therefore manipulating them manually is very difficult. Accordingly, various automated systems for manipulating transport container covers have been developed.

Some existing systems for manipulating truck container covers include telescopic arms deployed on opposite sides of the container to be covered. These arms are used to open and close the cover over the top of the container. Such systems may deploy the cover by extending the telescopic arms along the sides of the container. An example of such an existing system including a cover housing mounted on a retractable gantry is disclosed in U.S. Pat. No. 5,238,287, filed Aug. 14, 1992, of Edward N. Haddad, Jr.

While generally effective, covering systems including side mounted telescopic arms are not appropriate for all situations. For example, when a container being covered must be maneuvered in a relatively small area, the amount of clearance beyond the sides of the transport container may be minimal. In that circumstance, arms disposed beyond the sides of the container limit the maneuverability of the transport vehicle. Side mounted telescopic arms are also relatively expensive, and are susceptible to damage from inadvertent contact with walls or other vehicles.

For these reasons and others, it would be desirable to have a new system for covering a transport container. The new system should be conveniently operable by a single user, and should eliminate the need for any telescoping arms mounted to the sides of the container to be covered.

BRIEF SUMMARY OF THE INVENTION

In accordance with principles of the invention, there is disclosed a new system for manipulating a transport container cover using a variable height gantry. The variable height gantry supports an assembly for storing the cover and a clutch mechanism which operates to put the assembly for storing the cover into a freewheel mode. The gantry height is adjustable to a raised position such that the cover may be extended out of the storage assembly at a point above the top of the transport container. The system enables an operator to conveniently extend the cover over the top of the transport container when the gantry is in the raised position. In a first embodiment, the assembly for storing the cover is put into the freewheel mode and then the cover may be manually extended over the container by the operator. A motor is provided in the first embodiment to assist the operator in withdrawing the cover and/or taking up any excess cover length when securing the cover.

In a second embodiment, a bi-directional motor is provided to also assist in extending the cover out from the storage assembly, while the operator guides the cover over the top of the container, as well as in withdrawing the cover and/or taking up any excess cover length.

Alternatively, the present system may be embodied without a motor. In such alternative embodiments, a hand crank or spring loaded roller may be included as part of the assembly for storing the cover.

After the cover is extended out from the storage assembly, the operator uses an attachment mechanism on the end of the cover to secure it down over the top of the container. The gantry may be adjusted to a lower position for transporting the covered container.

The system is operable to withdraw the cover when the gantry is in its raised position. The gantry height may be adjusted hydraulically in response to a switch or lever, and the motor and clutch mechanism may be operated through radio signals generated by a wireless remote control.

Another feature of the disclosed system is a pair of independently mounted feeders which axially swivel to guide the cover to and from the storage assembly as the cover is withdrawn or extended. The feeders for example operate in conjunction with a rope or wire rope attached to the outside edges of the cover. The feeders accommodate variations in height between the outside edges of the cover.

Other aspects of the illustrative embodiment include a stiffening tube at the end of the cover to provide stability along its width and an alarm operable to alert an operator when the gantry is raised.

Thus there is provided a new system for covering a transport container. The disclosed cover system does not extend significantly beyond the profile of the container during transport, thus allowing good maneuverability of the transport vehicle carrying or embodying the container. The disclosed system further does not require costly side mounted telescoping arms, and can accommodate a variety of container heights. The disclosed system is also conveniently operable by a single user.

BRIEF DESCRIPTION OF THE SEVERAL VIEWS OF THE DRAWING

The invention will be more fully understood by reference to the following detailed description of the preferred embodiments in conjunction with the drawings, of which.

DETAILED DESCRIPTION OF THE PREFERRED EMBODIMENTS

Figure 1:
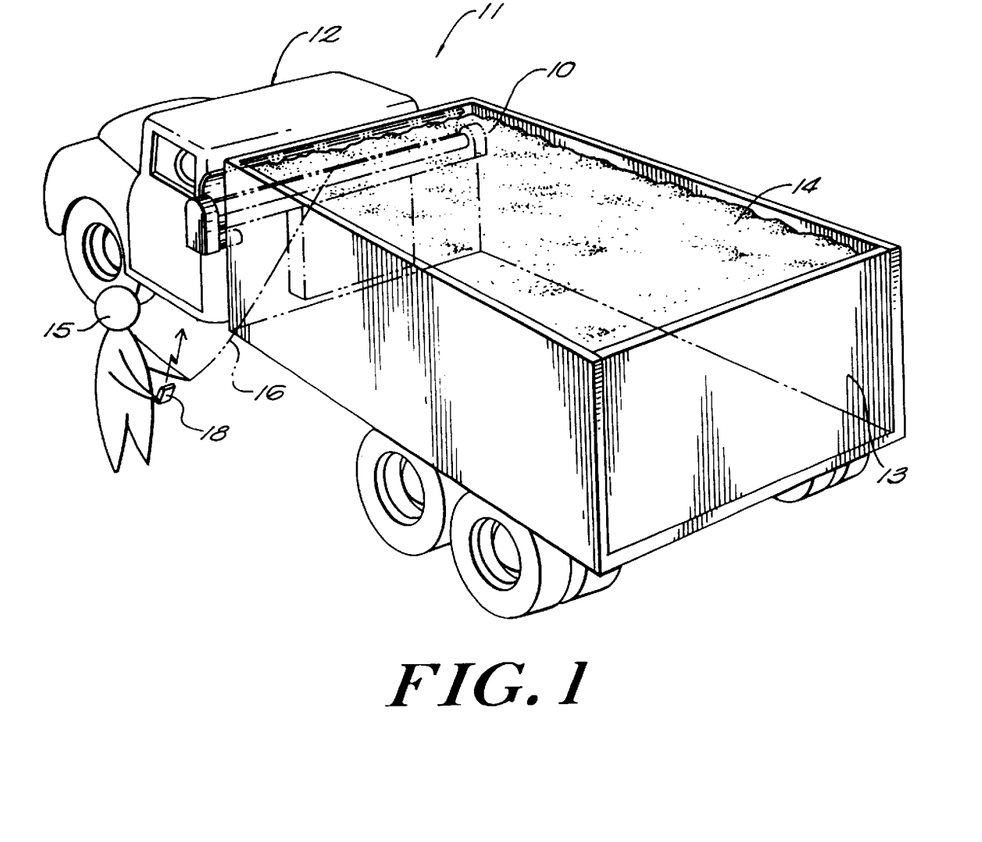
FIG. 1 shows an embodiment of a variable height covering system in a lowered position with the cover withdrawn, installed on a container truck.

FIG. 1 shows an embodiment of the disclosed variable height covering system 10 mounted on a truck 11. The covering system 10 is shown for purposes of illustration mounted between a truck cab 12 and a transport container 13 for holding a load 14. An operator 15 is shown holding a remote control 18 and a rope or line 16 that is attached to an end of a retracted flexible cover. The covering system 10 is shown in a lowered position such that the top of the covering system 10 does not extend significantly above the top of the truck cab 12, or the top of the transport container 13.

Figure 2:
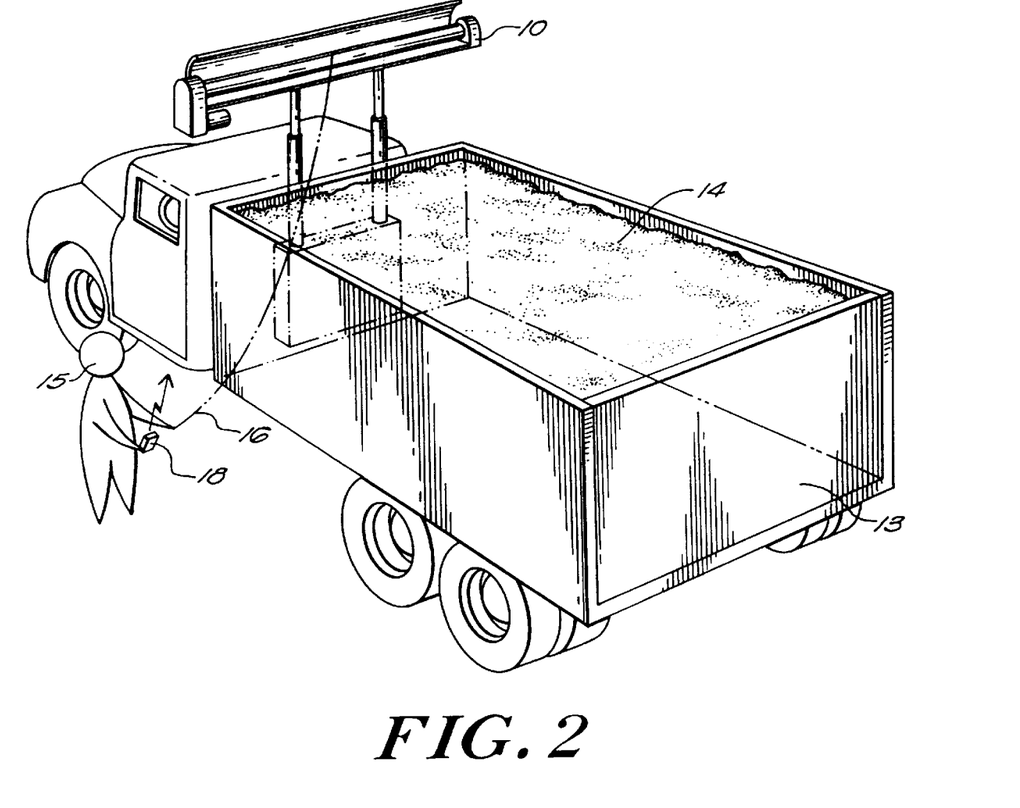
FIG. 2 shows the variable height covering system of FIG. 1 in a raised position.

FIG. 2 shows the covering system of FIG. 1 in a raised position. The height of the covering system 10 is for example adjusted by a hydraulic valve mounted to a gantry. The raised position of the covering system 10 raises an assembly for storing the cover so that the cover may be extended or withdrawn from a point above the top of the container 13 and the load 14 being transported. The operator 15 utilizes the remote control 18 to enable the assembly for storing the cover to release the cover. In a first exemplary embodiment, the cover storage assembly is enabled to release the cover through a freewheel mode of operation. In this first embodiment, a motor is supplied to assist in withdrawing the cover or in taking up excess cover length, when the storage assembly is not in the freewheel mode. When the assembly for storing the flexible cover is in the freewheel mode, the operator 15 may pull the rope 16 to extend the cover over the container 13, thus covering the load 14.

In a second embodiment, a bi-directional motor is provided to also assist in extending the cover out from the storage assembly, while the operator 15 guides the cover over the top of the container, as well as to assist the operator in withdrawing the cover and/or taking up any excess cover length when securing the cover.

Figure 3:
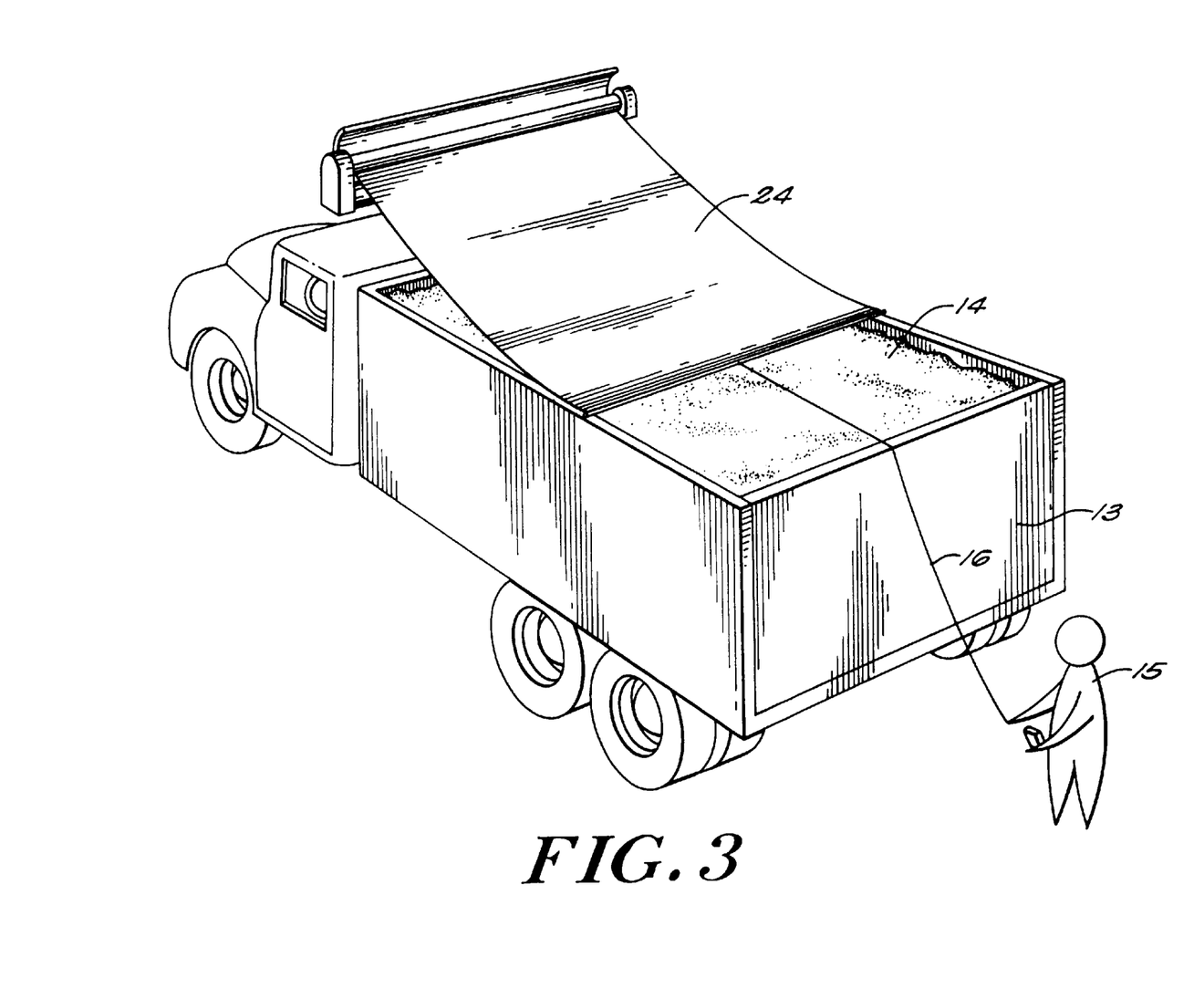
FIG. 3 shows the variable height covering system of FIG. 1 during extension of the cover over a container.
Figure 4:
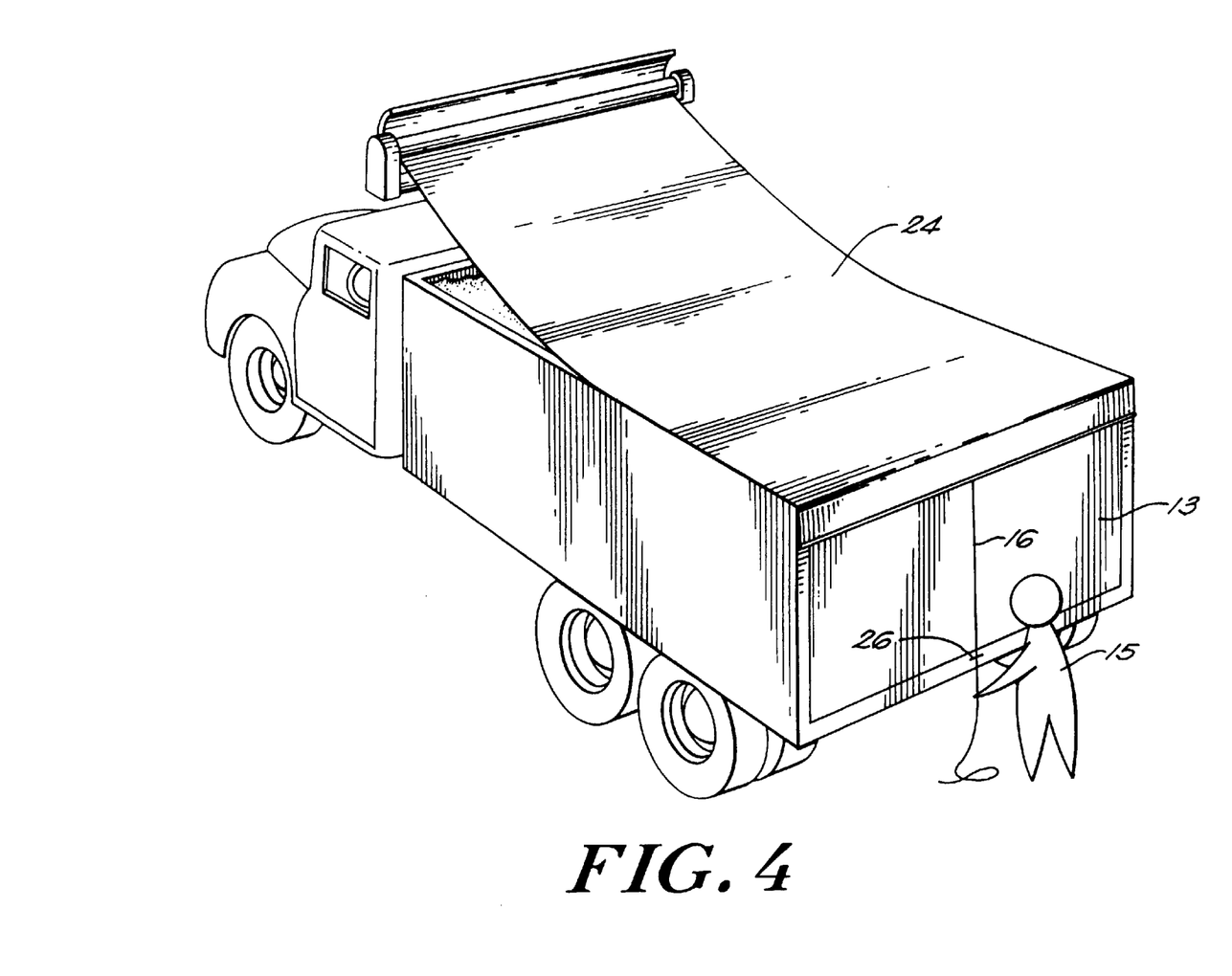
FIG. 4 shows the variable height covering system of FIG. 1 with the cover extended over the container.

FIG. 3 shows the operator 15 extending a flexible cover 24 over the top of the container 13 to cover the load 14 stored therein by pulling the rope 16 towards the back of the container 13. FIG. 4 shows the cover fully extended over the top of the container 13. Further in FIG. 4, the operator 15 is shown tying the rope 16 to an attachment point 26 in order to secure the cover 24 over the top of the container 13. While in the embodiment of FIG. 4 a rope is shown being tied to an attachment point to secure the cover 24, any other attachment system or mechanism may be used as an alternative or an addition to such tying of the rope. Such alternative attachment systems include hooks, rings, and other mechanisms which allow the rope to be easily secured and removed.

Figure 5:
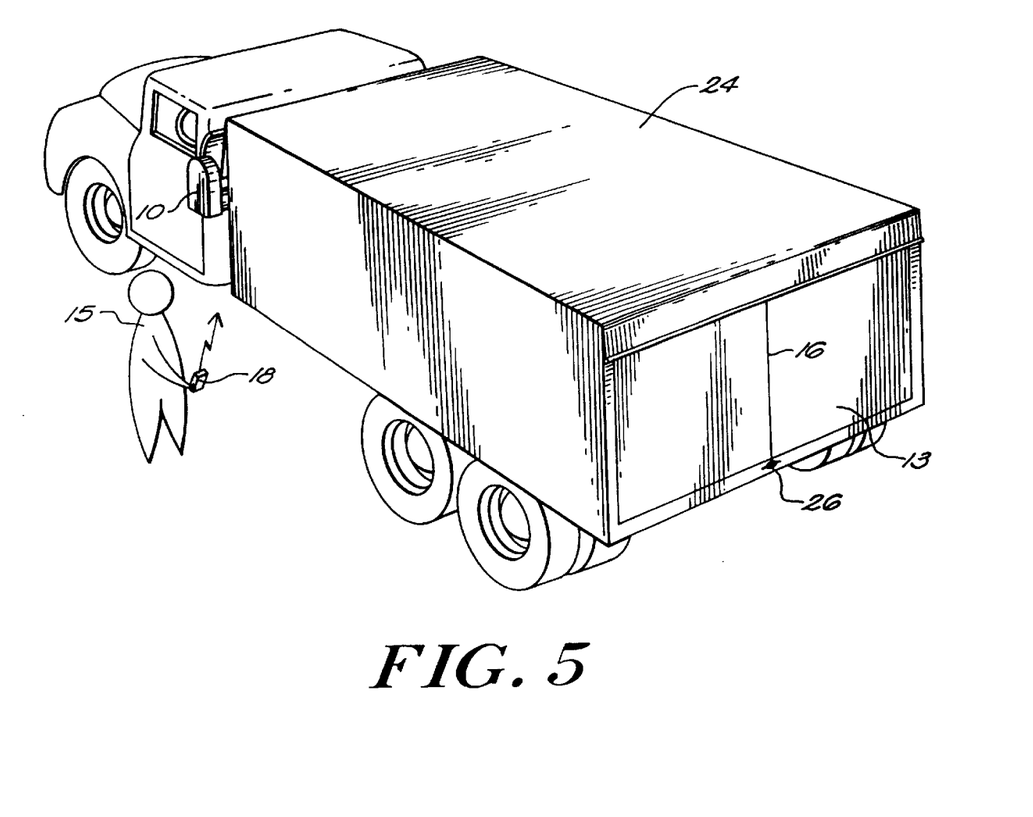
FIG. 5 shows the variable height covering system of FIG. 1 in a lowered position with the cover extended over the container and attached to an attachment point.

FIG. 5 shows the covering system 10 in a lowered position with the cover 24 fully extended over the top of the container 13, and having the cover 24 attached to the attachment point 26. The covering system 10 is adjusted to the lowered position by a hydraulic valve. The operator 15 takes the assembly for storing the cover out of the freewheel mode via the remote control 18. Any remaining slack in the cover 24 is then removed by way of a motor coupled to the assembly for storing the cover 24.

Figure 6:
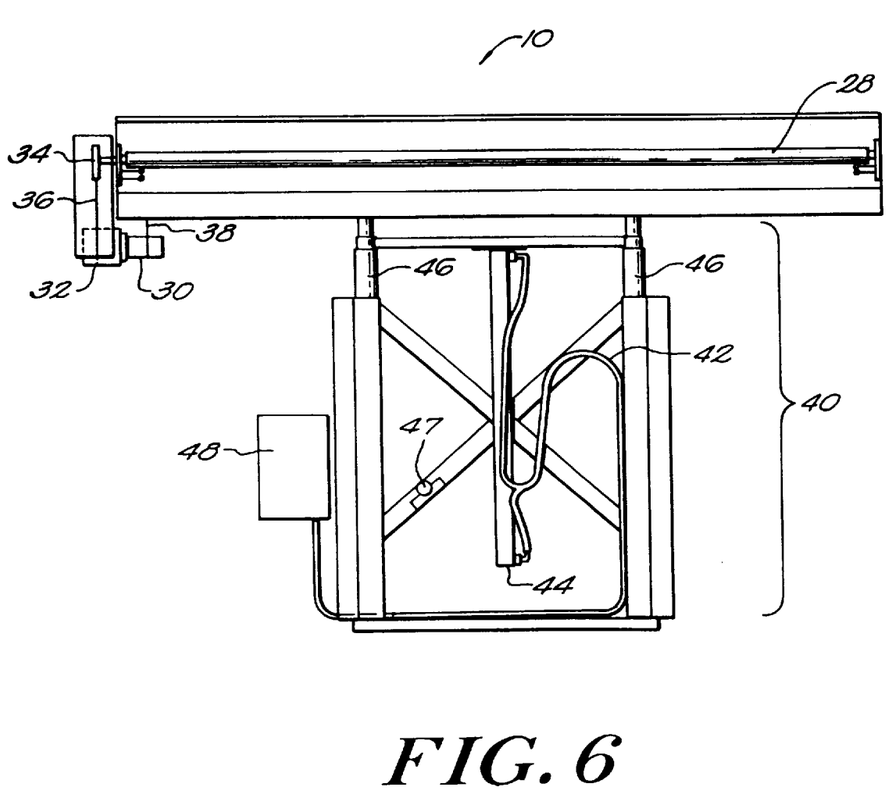
FIG. 6 is a front view of an embodiment of the disclosed variable height covering system in a lowered position.

FIG. 6 shows an exemplary embodiment of the covering system 10 in a lowered position. FIG. 6 includes an assembly for storing a flexible cover, including a roller 28 coupled to a unidirectional motor 30 having an electric clutch 32. The roller 28 is connected to a sprocket 34, around which a chain 36 is wound. The chain 36 is further coupled to the motor 30. When the electric clutch 32 is engaged, the roller 28 is put into a freewheel mode, allowing the cover to be unwound manually from the roller 28. When the clutch 32 is released, the roller 28 is locked, and the motor 30 may be activated via remote control to wind the flexible cover around the roller 28 so as to withdraw the cover. Additionally, when the electric clutch 32 is not engaged, the cover cannot be extended. When the electric clutch is engaged, the roller 28 is enabled to operate in a freewheel mode such that the cover may be manually extended over the top of the container.

Figure 7:
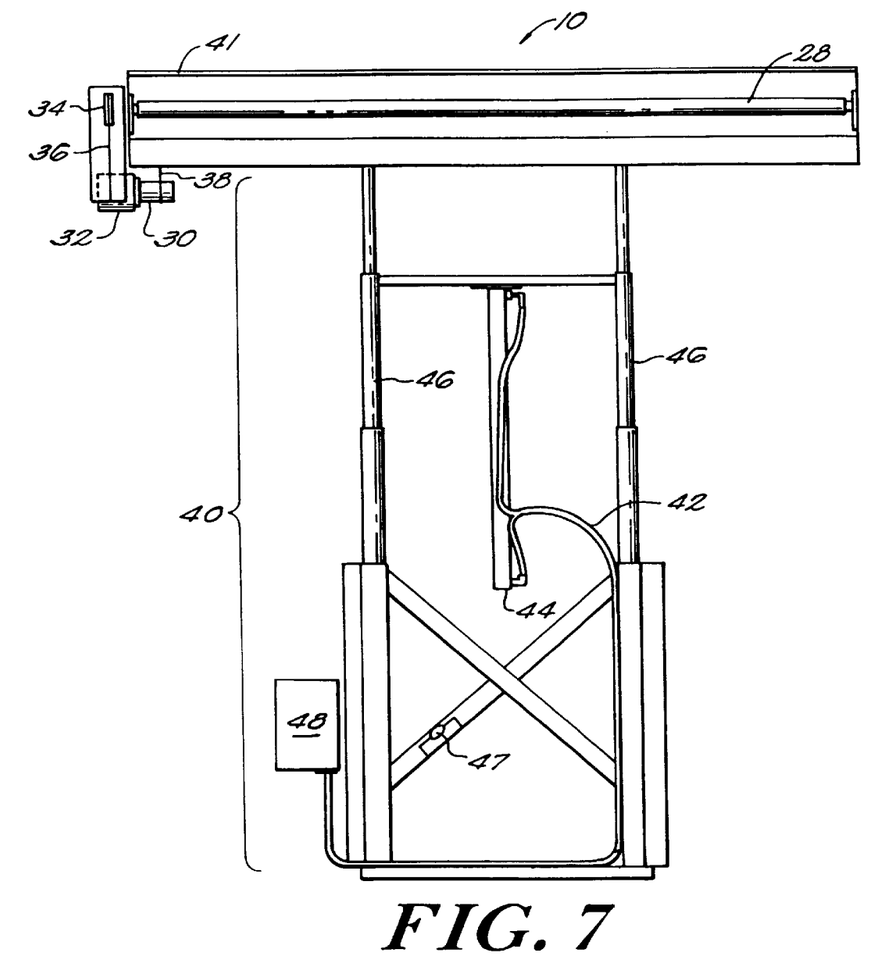
FIG. 7 is a front view of the variable height covering system of FIG. 6 in a raised position.

While a motor 30 and an electric clutch 32 are shown in FIG. 7 for purposes of illustration, the present invention is alternatively embodied without one or both of these elements. In such alternative embodiments, a mechanical clutch is provided to put the roller 28 into freewheel operation, and the cover may be withdrawn onto the roller 28 by manually turning the roller 28, for example by means of crank.

Further shown in FIG. 6 is a gantry 40 including telescoping arms 46 on which is supported a housing 41 containing the roller 28, and further supporting the motor 30 by means of a bracket 38. A hydraulic cylinder 44 is shown coupled via hose 42 to a hydraulic fluid source 48, and is used to adjust the height of the gantry 40.

An alarm 47 is shown attached to the gantry 40 for providing an alarm signal in the event that a height of the gantry 40 exceeds a predetermined level when the vehicle on which the container being covered prepares to move.

FIG. 7 shows the covering system of FIG. 6 in a raised position. The hydraulic cylinder 44 is used to adjust the height of the gantry 40 to any intended height between a minimum and a maximum. The maximum height may be designed such that the gantry 40 can be raised well above a load stored in the container being covered. In addition, the maximum height to which the gantry 40 may be adjusted can be selected so that a single embodiment of the disclosed covering system can be used in connection with various sized transport containers having a variety of heights. In an exemplary embodiment, the raised position of the covering system 10 as shown in FIG. 7 results in the assembly for storing the cover being raised approximately 48 inches above the top of the container to be covered.

For purposes of illustration, the hydraulic cylinder 44 is powered by a stand-alone electro-hydraulic power unit, such as hydraulic fluid source 48 as shown in FIG. 7. Alternatively, the hydraulic cylinder 44 may be powered by tapping into an existing hydraulic source on the transport vehicle as may be accomplished using a priority flow diverter in conjunction with a 4-way, open-centered directional control valve.

Figure 8:
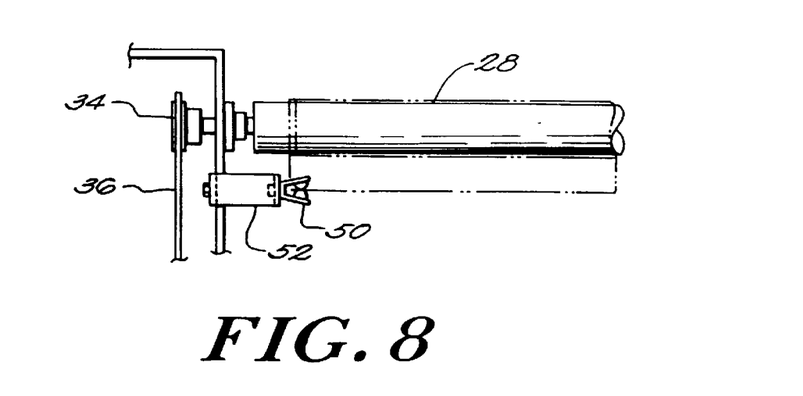
FIG. 8 is a front view of an embodiment of a winding mechanism and a feeder.

FIG. 8 shows elements in an embodiment of a winding mechanism for storing a flexible cover, together with a feeder 50, as embodied at one side of the roller 28. A feeder 50 is preferably mounted at both ends of the roller 28. The feeder 50 is shown mounted on a swivel bracket 52, permitting the feeder 50 to swivel axially in order to accommodate variations in height with regard to the sides of the cover as the cover is being fed onto or unrolled from the roller 28. In one embodiment the cover includes a profiling near its edge, such as by means of an attached wire rope, which is accommodated by the feeder 50.

Also shown in FIG. 8 are sprocket 34 and chain 36 which operate to rotate the roller 28, for example as a result of being driven by a motor.

Figure 9:
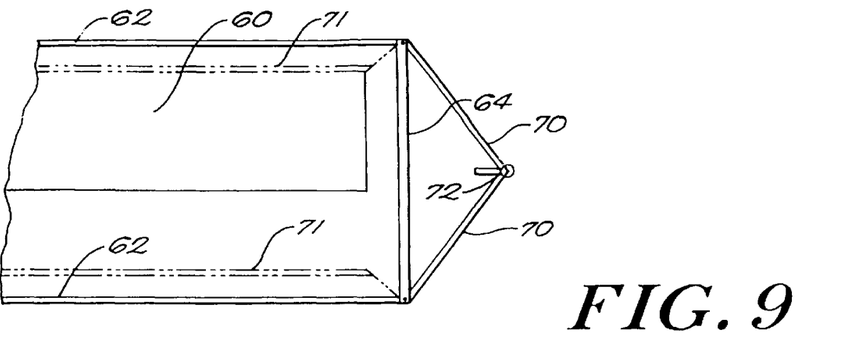
FIG. 9 is a top-rear view of an exemplary flexible cover.

FIG. 9 shows a flexible cover 60 which may be extended and/or withdrawn using the disclosed covering system. The cover 60 is composed substantially of a multi-mesh material, and includes a pair of wire ropes 62 disposed at its sides. A light weight aluminum tube 64 is shown within a pocket at the end of the cover 62 to provide lateral stability of the cover 60. A tapered end 70 of the cover 60 comes to a point at a ring 72. The ring 72 is an attachment mechanism used to secure the cover 60 to an attachment point such as a hook. A pair of flaps 71 are shown on the bottom of the cover 62, to be flipped down if needed to cover the load or container completely.

Figure 10:
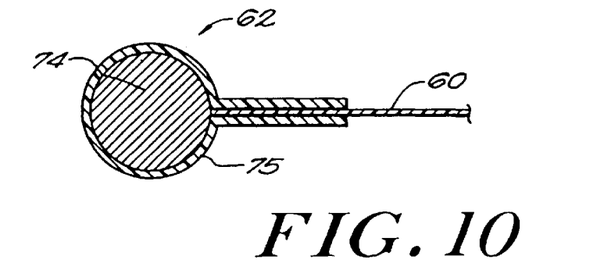
FIG. 10 is a cross section view showing a rope or wire rope attached to a side of a flexible cover.

FIG. 10 shows an illustrative embodiment of the wire rope 62 at the edges of the flexible cover manipulated by the disclosed covering system. The embodiment of FIG. 10 includes a plastic coated wire rope 74 encased in vinyl coated nylon 75, which is in turn attached to the multi-mesh material of flexible cover.

Figure 11:
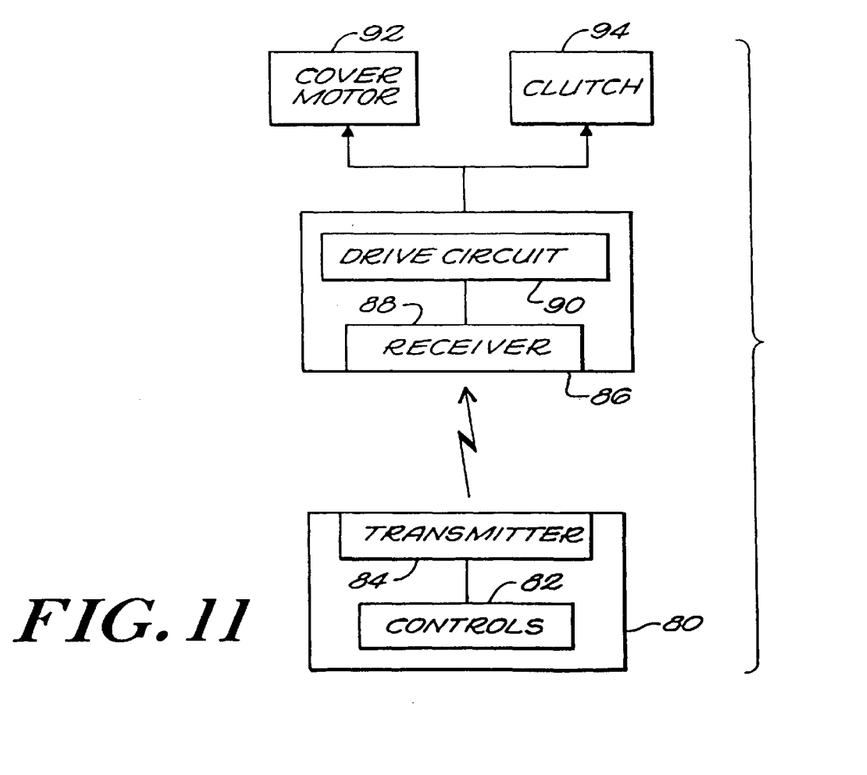
FIG. 11 is a block diagram showing a remote control unit and drive electronics.

FIG. 11 shows a remote control unit 80 including controls 82 coupled with a transmitter 84. Also shown in FIG. 11 is drive electronics 86 including a receiver 88 and a drive circuit 90. The drive circuit 90 is further communicative with a cover motor 92 and a clutch 94. The cover motor 92 for example corresponds to motor 30 as shown in FIGS. 6 and 7, the clutch 94 for example corresponds to the clutch 32 as shown in FIGS. 6 and 7.

Figure 12:
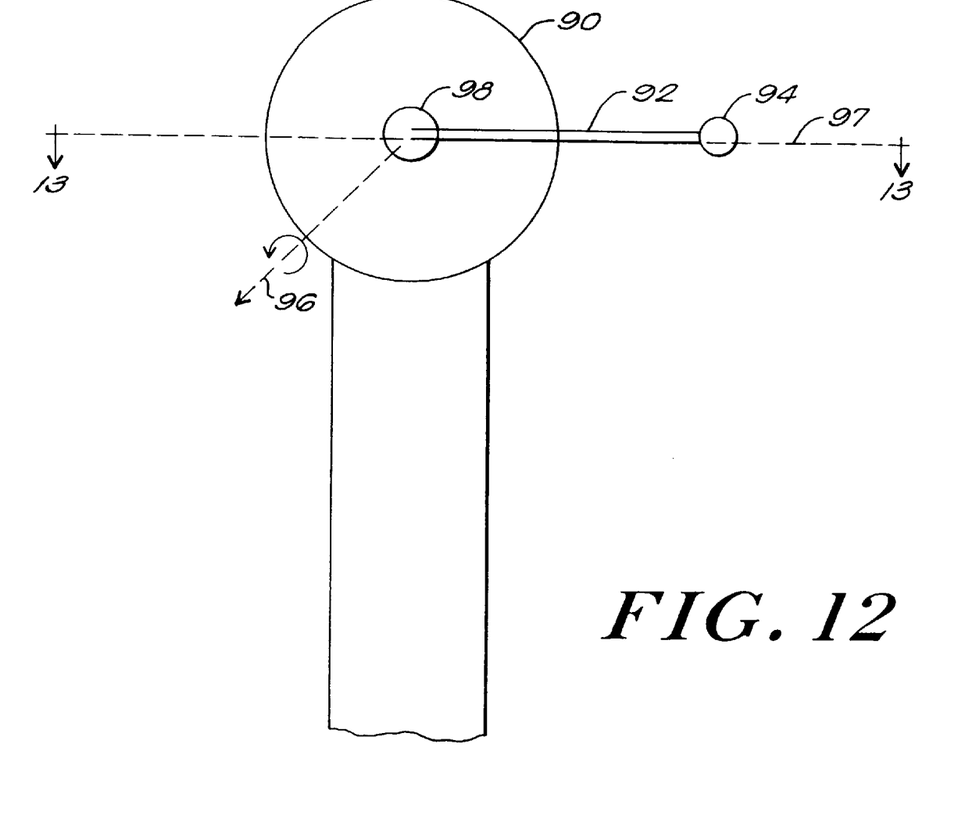
FIG. 12 is a cross sectional view showing an alternative embodiment of the present invention, including a winding mechanism operated by means of a hand crank.

During operation of the elements shown in FIG. 11, an operator asserts one or more of the operator controls 82, which causes transmission of a corresponding radio or other signal from the transmitter 84. The radio signal is received by the receiver 88 within the drive electronics 86, which are attached to the disclosed covering system. The drive circuit 90 processes the received radio signal and generates an electrical signal to one of the elements 92 and/or 94. The specific electrical signal generated depends on the specific radio signal received. For example, the controls 90 which operate the clutch 94 and/or the motor 92 cause corresponding radio signals to be transmitted from the transmitter 84 which in turn cause the drive circuit 90 to generate electrical signals to control the operation of the clutch 94 and the motor 92. In an alternative embodiment, the operation of the adjustable height gantry is also adjustable via the remote control unit 80. FIG. 12 shows an alternative embodiment of the disclosed system including a hand crank 90 for manually turning a roller 98 onto which the cover may be wound. An arm 92 is attached at one end to the crank 90, and has a handle 94 attached at an opposite end. During operation of the elements shown in FIG. 12, an operator may extend or retract the cover by gripping the handle 94 and turning the crank 90, whereby roller 98 is rotated around the axis 96. A second view of the crank shown in FIG. 12 is shown in FIG. 13 with relation to the plane 97.

Figure 13:
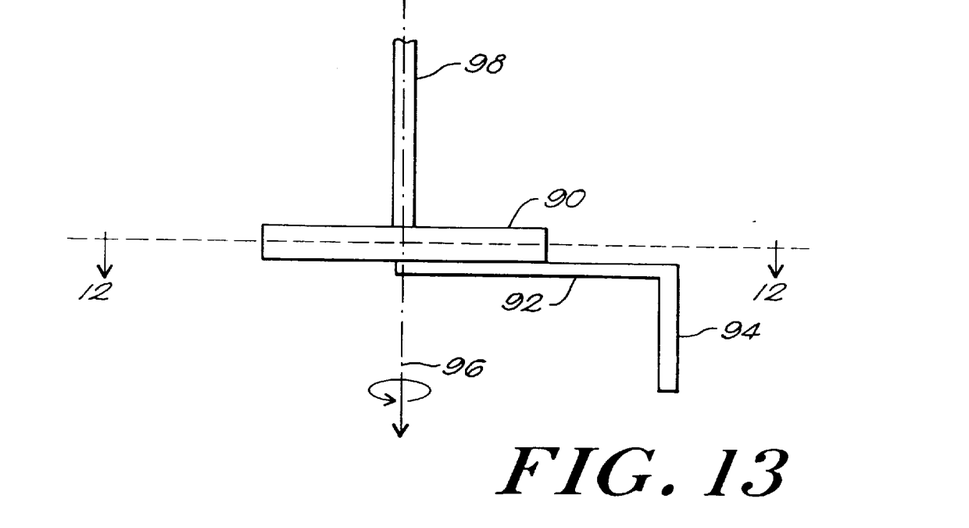
FIG. 13 is a top view of the winding mechanism show in FIG. 12.

FIG. 13 shows a top view of the crank 90 shown in FIG. 12. FIG. 13 shows the handle 94, arm 92 and roller 98, as shown also in FIG. 12.

In another alternative embodiment, the cover is stored by being wound around a spring loaded roller. An example of such a spring loaded roller is disclosed in U.S. Pat. No. 5,165,461 of Haddad, issued Nov. 24, 1992, all disclosures of which are hereby included by reference herein.

While the invention is described through the above exemplary embodiments, it will be understood by those of ordinary skill in the art that modification to and variation of the disclosed embodiments may be made without departing from the inventive concepts herein disclosed. Specifically, while the disclosed embodiments include reference to a cover system mounted on a truck, the present invention is equally applicable to being mounted on other transport vehicles with which transport containers are employed such as trailers or train cars. Accordingly the invention should not be viewed as limited except by the scope and spirit of the pending claims.

What is claimed is:

1. A system for covering a transport container, comprising:

a flexible cover having a first end and a second end;

an assembly for storing said cover, said assembly including a winding mechanism and a clutch mechanism for putting said assembly for storing said cover into a freewheel mode, wherein said winding mechanism includes a hand crank, and wherein said first end of said flexible cover is attached to said assembly for storing said cover;

a variable height gantry, said gantry supporting said assembly for storing said cover, said gantry adjustable to a first height, wherein said assembly for storing said cover is above a top of said container when said gantry is at said first height, and wherein said system is operable to extend said cover over said top of said container when said assembly for storing said cover is in said freewheel mode and said gantry is at said first height;

an attachment device coupled to a second end of said cover, said attachment device removably securable to an attachment point when said cover is fully extended over said top of said container; and wherein said gantry is further adjustable to a second height when said cover is fully extended over said top of said container and said attachment device is removably secured to said attachment point, said second height lower than said first height, and wherein said assembly for storing said cover is substantially below said top of said container when said gantry is at said second height.

2. The system of claim 1, wherein said attachment device is a rope, and wherein said rope is securable to said attachment point by tying said rope to said attachment point.

3. The system of claim 1, wherein said winding mechanism includes at least one roller.

4. The system of claim 3, further comprising a pair of feeders, said feeders guiding said flexible cover onto said winding mechanism when said cover is withdrawn from said top of said container, said feeders operating in conjunction with a raised profile proximate to outside edges of said cover.

5. The system of claim 4, wherein said pair of feeders are independently mounted to swivel axially in order to accommodate any variation in height between said outside edges of said cover.

6. The system of claim 1, wherein said gantry is adjusted to said second height prior to transporting said container.

7. The system of claim 1, wherein said system is operable to withdraw said cover from said top of said container with said gantry in said first position and said mechanism for storing said cover is not in said freewheel mode.

8. The system of claim 1, wherein said clutch mechanism is responsive to a remote control.

9. The system of claim 8, wherein said remote control is wireless.

10. The system of claim 1, wherein said cover includes a stiffening tube at said second end to provide stability along its width.

11. The system of claim 1, further comprising an alarm operable to alert an operator when said gantry is not at said second height.

12. The system of claim 1, further comprising a truck, and wherein said transport container is removably mounted on said truck.

13. The system of claim 1, further comprising a truck, and wherein said transport container is integral to said truck.

14. The system of claim 1, further comprising a truck, and wherein said variable height gantry is mounted on said truck.

15. The system of claim 1, further comprising a trailer, and wherein said transport container is mounted on said trailer.

16. The system of claim 1, further comprising a trailer, and wherein said variable height gantry is mounted on said trailer.

17. The system of claim 1, wherein said hand crank includes an arm and a handle.

18. A method of manipulating a flexible cover for a transport container, comprising:
   adjusting a variable height gantry to a first height, said variable height gantry supporting an assembly for storing said cover, said assembly for storing said cover including a winding mechanism and a clutch mechanism, said winding mechanism including a hand crank, said clutch mechanism for putting said assembly for storing said cover into a freewheel mode, wherein a first end of said flexible cover is attached to said assembly for storing said cover, and wherein said assembly for storing said cover is above a top of said container when said variable height gantry is at said first height;
   putting said assembly for storing said cover into said freewheel mode;
   extending said cover over said top of said container;
   securing a second end of said cover, said securing including removably securing an attachment device to an attachment point while said cover is fully extended over said top of said container; and
   lowering said variable height gantry to a second height when said cover is fully extended over said top of said container and said attachment device is removably secured to said attachment point, said second height lower than said first height, and wherein said assembly for storing said cover is substantially below said top of said container when said gantry is at said second height; and
   withdrawing said cover, wherein said withdrawing is accomplished by using said hand crank.

19. The method of claim 18, further comprising:
   taking said assembly for storing said cover out of said freewheel mode; and
   operating said assembly for storing said cover to wind up excess length of said cover.

20. The method of claim 18, wherein said securing includes tying a rope to an attachment point.

21. The method of claim 18, wherein said winding mechanism includes a clutch, and wherein said extending includes engaging said clutch to put said winding mechanism into a freewheel mode.

22. The method of claim 18, further comprising controlling said adjusting of said variable height gantry via a switch coupled to said gantry.

23. The method of claim 18, further comprising putting said winding mechanism in a freewheel mode via a remote control.

24. A system for manipulating a flexible cover for a transport container, said flexible cover having a first end and a second end, comprising:
   an assembly for storing said cover, wherein said first end of said cover is attached to said assembly for storing said cover, and wherein said assembly for storing said cover includes a winding mechanism including a hand crank;
   a variable height gantry supporting said assembly for storing said cover;
   means for adjusting said variable height gantry to a first height, wherein said assembly for storing said cover is substantially above a top of said transport container when said variable height gantry is at said first height;
   means for putting said winding mechanism into a freewheel mode;
   means for extending said cover over said top of said transport container; means for securing said second end of said cover while said cover is fully extended over said top of said container, said means for securing including a removably securable attachment device coupled to said second end of said cover, wherein said removably securable attachment mechanism is removably securable to an attachment point; and
   means for lowering said variable height gantry to a second height when said cover is fully extended over said top of said container and said attachment device is removably secured to said
   attachment point, said second height lower than said first height, and wherein said assembly for storing said cover is substantially below said top of said container when said gantry is at said second height.

25. A system for covering a transport container, comprising:
   a flexible cover having a first end and a second end;
   an assembly for storing said cover, said assembly including a winding mechanism coupled to said first end of said cover, wherein said winding mechanism includes a hand crank;
   a variable height gantry, said gantry supporting said assembly for storing said cover, said gantry adjustable to a first height, wherein said assembly for storing said cover is substantially above a top of said container when said gantry is at said first height, and wherein said system is operable to extend said cover over said top of said container by unwinding said flexible cover from said winding mechanism when said gantry is at said first height;
   an attachment device coupled to said second end of said cover, said attachment device removably securable to an attachment point when said cover is fully extended over said top of said container; and
   wherein said gantry is further adjustable to a second height when said cover is fully extended over said top of said container and said attachment device is removably secured to said attachment point, said second height lower than said first height, and wherein said assembly for storing said cover is substantially below said top of said container when said gantry is at said second height.

26. The system of claim 25, wherein said attachment device is a rope, and wherein said rope is securable to said attachment point by tying said rope to said attachment point.

27. The system of claim 25, wherein said winding mechanism includes at least one roller.

28. The system of claim 25, wherein said gantry is adjusted to said second height prior to transporting said container.

29. The system of claim 25, wherein said hand crank includes an arm and a handle.

30. A method of manipulating a flexible cover for a transport container, comprising:

adjusting a variable height gantry to a first height, said variable height gantry supporting an assembly for storing said cover, wherein said assembly for storing said cover is substantially above a top of said container when said gantry is at said first height, said assembly for storing said cover including a winding mechanism, wherein said winding mechanism includes a hand crank, and wherein a first end of said flexible cover is attached to said assembly for storing said cover;

extending said cover over said top of said container by unwinding said winding mechanism under power of said motor;

securing a second end of said cover, said securing including removably securing an attachment mechanism to an attachment point while said cover is fully extended over said top of said container; and lowering said variable height gantry to a second height when said cover is fully extended over said top of said container and said attachment device is removably secured to said attachment point, said second height lower than said first height, and wherein said assembly for storing said cover is substantially below said top of said container when said gantry is at said second height.

31. A system for manipulating a flexible cover for a transport container, said flexible cover having a first end and a second end, comprising:

an assembly for storing said cover, wherein said first end of said cover is attached to said assembly for storing said cover and wherein said assembly for storing said cover includes a winding mechanism;

a variable height gantry supporting said assembly for storing said cover;

means for adjusting said variable height gantry to a first height, wherein said assembly for storing said cover is substantially above a top of said container when said variable height gantry is at said first height;

means for extending said cover over said top of said container by unwinding said winding mechanism;

means for securing a second end of said cover, while said cover is fully extended over said top of said container, said means for securing including a removably securable attachment device coupled to said second end of said cover, wherein said removably securable attachment mechanism is removably securable to an attachment point; and means for lowering said variable height gantry to a second height when said cover is fully extended over said top of said container and said attachment device is removably secured to said attachment point, said second height lower than said first height, and wherein said assembly for storing said cover is substantially below said top of said container when said gantry is at said second height.

32. A system for covering a transport container, comprising:

a flexible cover having a first end and a second end;

an assembly for storing said cover, said assembly including a winding mechanism and a clutch mechanism for putting said assembly for storing said cover into a freewheel mode, wherein said winding mechanism includes a spring loaded roller, and wherein said first end of said flexible cover is attached to said assembly for storing said cover;

a variable height gantry, said gantry supporting said assembly for storing said cover, said gantry adjustable to a first height, wherein said assembly for storing said cover is above a top of said container when said gantry is at said first height, and wherein said system is operable to extend said cover over said top of said container when said assembly for storing said cover is in said freewheel mode and said gantry is at said first height;

an attachment device coupled to a second end of said cover, said attachment device removably securable to an attachment point when said cover is fully extended over said top of said container; and wherein said gantry is further adjustable to a second height when said cover is fully extended over said top of said container and said attachment device is removably secured to said attachment point, said second height lower than said first height, and wherein said assembly for storing said cover is substantially below said top of said container when said gantry is at said second height.

33. A method of manipulating a flexible cover for a transport container, comprising:

adjusting a variable height gantry to a first height, said variable height gantry supporting an assembly for storing said cover, said assembly for storing said cover including a winding mechanism, said winding mechanism including a spring loaded roller, wherein a first end of said flexible cover is attached to said assembly for storing said cover, and wherein said assembly for storing said cover is above a top of said container when said variable height gantry is at said first height;

extending said cover over said top of said container;

securing a second end of said cover, said securing including removably securing an attachment device to an attachment point while said cover is fully extended over said top of said container;

lowering said variable height gantry to a second height when said cover is fully extended over said top of said container and said attachment device is removably secured to said attachment point, said second height lower than said first height, and wherein said assembly for storing said cover is substantially below said top of said container when said gantry is at said second height;

withdrawing said cover, wherein said withdrawing of said cover is accomplished by using said spring loaded roller.

34. A system for covering a transport container, comprising:

a flexible cover having a first end and a second end;

an assembly for storing said cover, said assembly including a winding mechanism coupled to said first end of said cover, wherein said winding mechanism includes a spring loaded roller;

a variable height gantry, said gantry supporting said assembly for storing said cover, said gantry adjustable to a first height, wherein said assembly for storing said cover is substantially above a top of said container when said gantry is at said first height, and wherein said system is operable to extend said cover over said top of said container by unwinding said flexible cover from said winding mechanism when said gantry is at said first height;

an attachment device coupled to said second end of said cover, said attachment device removably securable to an attachment point when said cover is fully extended over said top of said container; and wherein said gantry is further adjustable to a second height when said cover is fully extended over said top of said container and said attachment device is removably secured to said attachment point, said second height lower than said first height, and wherein said assembly for storing said cover is substantially below said top of said container when said gantry is at said second height.

* * * * *